United States Patent [19]
Benoit

[11] Patent Number: 5,873,975
[45] Date of Patent: Feb. 23, 1999

[54] METHOD AND APPARATUS FOR TINTING VEHICLE WINDOWS

[76] Inventor: Gary Benoit, 1233 Old Dixie Hwy., Lake Park, Fla. 33403

[21] Appl. No.: 558,427

[22] Filed: Nov. 16, 1995

[51] Int. Cl.$^6$ ...................................................... B32B 31/00
[52] U.S. Cl. ........................... 156/510; 156/538; 156/540; 156/234; 156/238; 428/187
[58] Field of Search ....................... 204/129.65; 156/630, 156/234, 542, 299, 562, 476, 387, 540, 541, 561, 235, 538, 238

[56] References Cited

U.S. PATENT DOCUMENTS

| | | | |
|---|---|---|---|
| 4,342,155 | 8/1982 | Waldron | 33/184.5 |
| 4,940,622 | 7/1990 | Leavitt, Sr. et al. | 428/137 |
| 5,213,656 | 5/1993 | Lis et al. | 156/630 |

*Primary Examiner*—Merrick Dixon
*Attorney, Agent, or Firm*—McHale & Slavin, P.A.

[57] ABSTRACT

A computerized apparatus and method for creating and databasing vehicular window template information in memory storage with such template information being used by a window tinting system to generate window tinting film sections for use on corresponding target windows. The database would be continually increased by feeding new digitized window template images into the computer for appropriate scaling, classification, and storage. When tinting a known vehicle, the previously entered template information can be accessed and this will greatly enhance the speed and accuracy of the window tinting process.

5 Claims, 4 Drawing Sheets

METHOD AND APPARATUS FOR TINTING VEHICLE WINDOWS

FIELD OF THE INVENTION

This invention relates generally to window tinting and in particular to a computerized apparatus and method for tinting planar and non-planar vehicular windows.

BACKGROUND OF THE INVENTION

Vehicle window tinting is a time intensive operation frequently performed on vehicles to protect the interior and occupants from harmful ultraviolet rays. Such window tinting is especially common in southern climates where vehicles face intensive exposure to sunlight. Wherein window tinting further lessens the burden on the air conditioning system. The plastic material used in tinting further protects the occupants preventing glass from shattering should the vehicle be involved in an accident.

Window tinting may be performed by the vehicle manufacturer, but is more often performed by after-market specialists. These specialists perform a labor intensive process for each window which includes: cleaning the exterior windows; covering each window with a sheet of window tint from the exterior and securing it temporarily in place with a soap and water mixture; physically cutting (with a sharp instrument) the window film to fit the area to be covered and hence act as a template for similar windows; carefully removing the window film template; using the window film template as a guide to cut other similarly needed pieces of tinting film; cleaning the interior of the window; applying the tinting film to the window; removing any extraneous film material from the exterior of the window and cleaning both the exterior surface of the window and the surrounding vehicle, as necessary. Usually, the window film template is actually applied to one of the target windows. Alternatively, a different material, other than window tinting film, might be used for making the template. Window tinting film would then be formed from the template shape as necessary.

Due to the number of steps involved, vehicular window tinting is time consuming, for any minute mistake will have an unsightly finish. With each vehicle to be tinted, the general practice is to make a new template for each window (or set of window pairs). This involves the aforementioned steps of cleaning the vehicle windows before applying the template material. Accordingly, any minimization—or even elimination—of the steps involved would greatly reduce the amount of time needed to tint a vehicle. There always exists the chance of damaging the vehicle when cutting the window template with a sharp object. Any minimization of contact with the exterior of the vehicle would greatly reduce the chance of damage by a tinting film installer.

As an additional result of the numerous steps involved, the level of artistry needed to properly apply and cut both the templates and tinting film requires a relatively high degree of training for each employee in this field. Optimization of tinting film is also a relatedly important consideration and training skill. As a variety of shapes are being cut from wide sheets of tinting film, the proper anticipation of their placement will produce less waste film. Novice or unskilled employees are more likely to make improper tint film cuts from a window template. Minimizing film waste is paramount to achieving competitive prices for the consumer and profitability for the window tinting specialist.

Prior disclosures include U.S. Pat. No. 5,421,939 which shows a CAD (computer-aided design) system connected to a CAM (computer-aided manufacturing) system which is used for the formation and attachment of a multiple-layer film graphic to a glass window of a storefront or building. Such store and building windows are generally planar in nature and not contoured like vehicular windows. Moreover, Patent '939 uses a complex multi-layering of window film, carrier film, support film, and transfer tape to form the window graphic. Such multi-layering is not necessary or even desirable for tinting vehicle windows. Thus, '939 discloses a method to manufacture and assemble, in a controlled environment, a multi-layered (and often multi-colored) window graphic prior to application to the planar surface of a store or building front and fails to disclose a method or apparatus for tinting non-planar windows. In the field of vehicular window tinting, for instance, it is extremely important to be able to fit the film over both the planar surfaces and contoured shapes encountered on vehicular windows.

Accordingly, a window tinting system is needed which minimizes the steps needed to tint non-planar vehicle windows. In particular, the steps which require repeatedly making the same window templates are eliminated by creating a computer database of existing window templates which could then drive a computer-assisted film cutting device. This would reduce the level of skill and the training time needed for each employee of a window tinting shop. This would also correspondingly reduce the amount of waste film material produced in performing the overall tinting process. Moreover, such a system should efficiently account for the complex curvature of most vehicular windows in creating its computer database.

SUMMARY OF THE INVENTION

The present invention provides a computerized window tinting apparatus and method for creating and storing window template patterns which conform to curved windows in a database. The patterns are then retrieved as needed and used to drive a precision film cutting device for cutting single layers of film for application to a target window. The apparatus and method involves producing a set of vehicular window patterns and then compiling and storing these patterns into a database for later access. The host computer uses these stored patterns to drive a film cutting mechanism.

It is therefore an object of the present invention to provide an apparatus and method for producing single layered window tinting film sections for installation on the planar and contoured windows of a vehicle.

It is a further object of the present invention to provide an apparatus and method for producing single layered window tinting film sections which eliminates the need to create a new template each time a target window is to be tinted.

It is a further object of the present invention to provide an apparatus and method for producing single layered window tinting film sections, the apparatus and method utilizing a computer for storing window template shapes in a structured database, and a computer driven cutting device for precision cutting of the film sections.

It is yet a further object of the present invention to provide an apparatus and method for producing single layered window tinting film sections, the method including steps to progressively add new vehicular window template shapes to the database.

It is still a further object of the present invention to provide an apparatus and method for producing single layered window tinting film sections, with the method for progressively adding new vehicular window template shapes to the database including the steps of forming a master template, photographing the template, scanning the photographed template into a computer file, scaling the scanned template, fine tuning the scaled template by comparing it with the master template, and storing the scaled template for future reference.

It is yet a further object of the present invention to provide an apparatus and method for producing single layered window tinting film sections, with the method for progressively adding new vehicular window template shapes to the database including the steps of forming a master template, photographing the template with a digital camera, downloading the digital photograph into a computer file, scaling the digitized template, fine tuning the scaled template by comparing it with the master template, and storing the scaled template for future reference.

It is still a further object of the present invention to provide an apparatus and method for producing single layered window tinting film sections, with the method for progressively adding new vehicular window template shapes to the database including the steps of tracing master template, photographing the template, scanning the photographed template into a computer file, scaling the scanned template, fine tuning the scaled template by comparing it with the master template, and storing the scaled template for future reference.

It is still a further object of the present invention to provide an apparatus and method for producing single layered window tinting film sections, with the method for progressively adding new vehicular window template shapes to the database including the steps of tracing master template, scanning the traced template directly into a computer file, scaling the scanned template, fine tuning the scaled template by comparing it with the master template, and storing the scaled template for future reference.

It is yet a further object of the present invention to provide an apparatus and method for producing single layered window tinting film sections, with the method for progressively adding new vehicular window template shapes to the database including the steps of tracing a master template, photographing the template tracing with a digital camera, downloading the digital photograph into a computer file, scaling the digitized template, fine tuning the scaled template by comparing it with the master template, and storing the scaled template for future reference.

Still a further object of the present invention is to provide an apparatus and method as before, but with a digitizing means, such as a scanning device, for directly scanning the digitized template image into the computer without the interim photographic step. Whereas the overall size of the template image might be greater than the scanning surface of the device, portions of the template could be scanned and then joined together again in the computer.

A related object of the present invention is to provide an apparatus and method as before, but with a digitizing means, such as a computer-interfaced digitizing pen/wand for conveniently transferring the shape of an object into the computer without the interim photographic step.

It is a further object of the present invention to provide an apparatus and method for producing single layered window tinting film sections for installation on the planar and contoured windows of automobiles.

It is a further object of the present invention to provide an apparatus and method for producing single layered window tinting film sections for installation on the planar and contoured windows of boats.

It is a further object of the present invention to provide an apparatus and method for producing single layered window tinting film sections for installation on the planar and contoured windows of trucks and vans.

It is a further object of the present invention to provide an apparatus and method for producing single layered window tinting film sections for installation on the planar and contoured windows of recreational vehicles (RV's).

It is a further object of the present invention to provide an apparatus and method for producing single layered window tinting film sections for installation on the planar and contoured windows of aircraft.

It is a further object of the present invention to provide an apparatus and method for producing single layered window tinting film sections for installation on the planar and contoured windows of motorcycles.

It is a further object of the present invention to provide an apparatus and method for producing single layered window tinting film sections for installation on the planar and contoured windows of windowed structures needing protection from exposure to the sun.

Other objects and advantages of this invention will become apparent from the following description taken in conjunction with the accompanying drawings wherein set forth, by way of illustration and example, are certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention is described in terms of a preferred specific embodiment, it will be readily apparent to those skilled in this art that various modifications, rearrangements and substitutions can be made without departing from the spirit of the invention. The scope of the invention is defined by the claims appended hereto.

Figure 1:
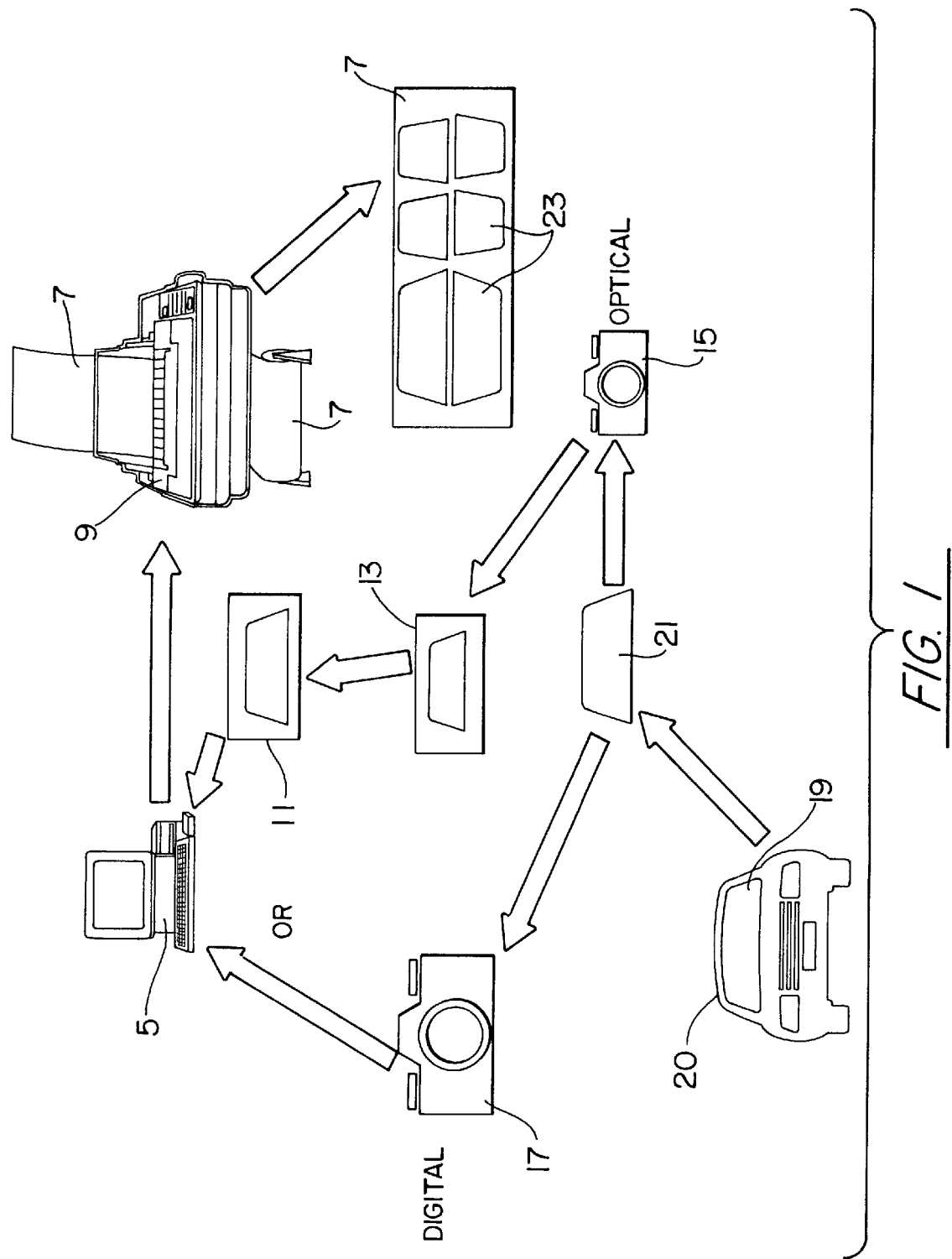
FIG. 1 is a functional block diagram showing the apparatus and method for updating and utilizing the computer database of vehicular window templates.

Referring now to FIG. 1, the system 1 of the present invention utilizes a computer 3 to create and store a database in memory 5 (shown in fathom) of vehicular window templates. For this example the vehicle is an automobile 20. The set of window templates can be retrieved and used to cut window tinting film 7 each time that particular model of automobile enters a shop for window tinting. Upon retrieving the collective templates from computer memory 5, the template shape can be used to drive a film cutting device 9 which is capable of cutting only the film and not the film backing. Accordingly, this precision-cut section of film can be easily applied to a target window.

The database might exist under a variety of formats and would essentially provide an organized collection of automobile window templates for reference, retrieval, and export to the cutting device. As a new or different vehicle enters the shop, it becomes necessary to progressively update the database with the new template information. While a variety of methods might be used to enter this template information into the database, the preferred embodiment utilizes a process whereby a master template is created, digitized, loaded into a graphics program, scaled, and refined.

Figure 2:
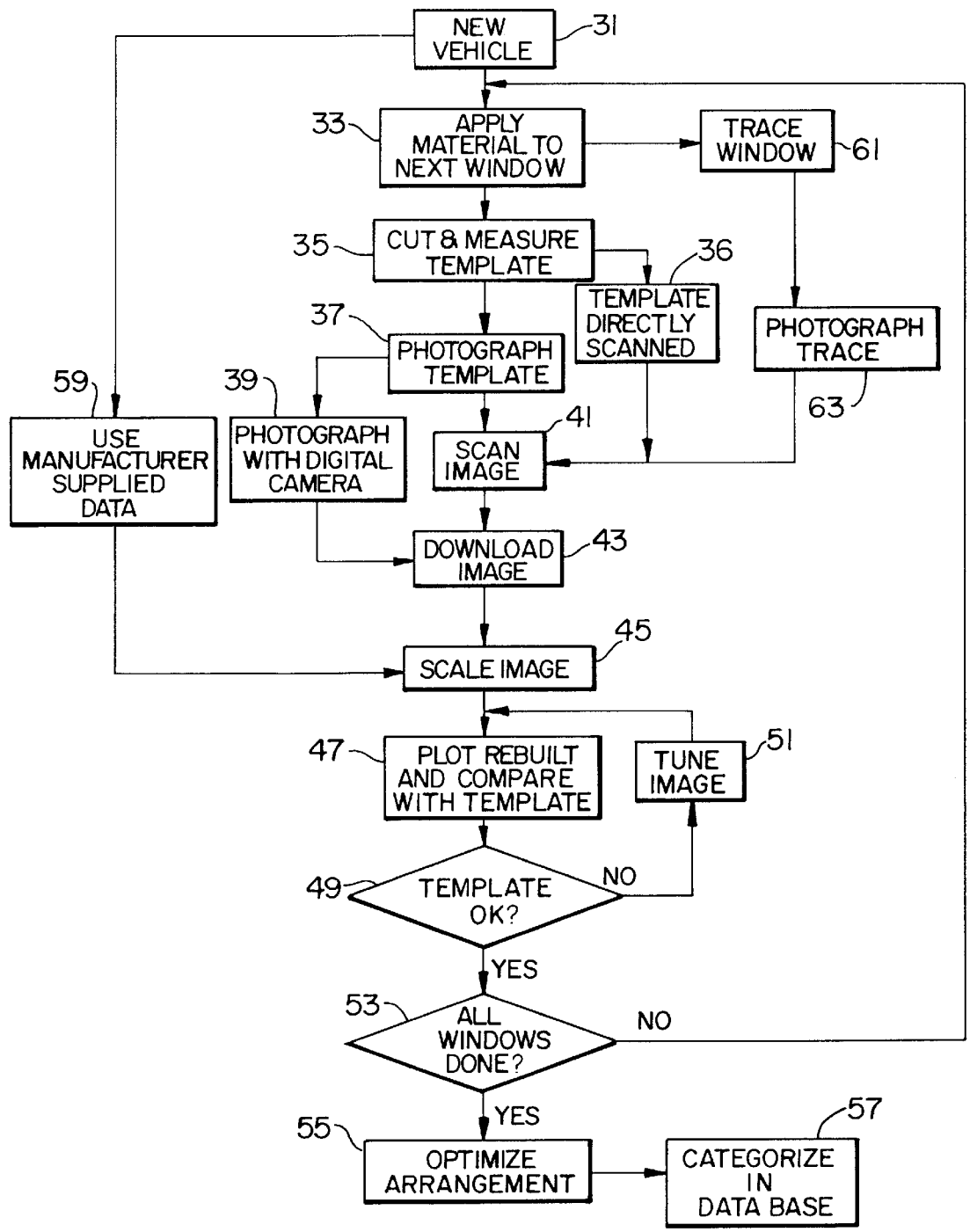
FIG. 2 is a flowchart of the steps performed in updating the computer database with new vehicular window template information.

Referring now to FIGS. 1 and 2, a flow chart is shown of the steps used in updating the database with new vehicle 31 information. Because automobile windows often consist of compound curved surfaces, a template of each original target window is made from a suitable template material (e.g. window tint, paper, plastic, etc.). This template is formed in the usual manner of affixing 33 the template material 21 to the outside surface of the target window 19 and manually cutting 35 the desired shape. Hence, the resulting template 21 directly conforms to the shape of the curved window with the necessary conforming pattern being revealed when the template is removed and laid flat. The flattened template is then measured 35 and its overall width and height are recorded for later scaling reference. The template is placed on a surface with a white background and photographed 37 by either a conventional camera or photographed 39 by a digital camera 17. For the best photographic results, the template material 21 is preferably a black or dark contrasting material. This resulting master template is then saved to later fine tune the computerized template image.

When a conventional camera 15 is used, the film is developed into a photograph 13. The photograph is then scanned 41 and downloaded 43 into a computer file as a digitized image by a digital scanner 11 as connected to the computer 3. The digitized image is used by a graphics program such as, but not limited to, ADOBE ILLUSTRATOR, CORELDRAW, CASMATE, FLEXI-SIGN PRO, etc, whereby the preferred embodiment currently uses CASMATE. When a digital camera 17 is used, the digitized image can be downloaded 43 directly into the computer 3 for similar use by the aforementioned graphics programs.

Each template image is upwardly scaled 45 to its originally measured size. Each graphics program will vary in its ability to accurately scale the template image. With CASMATE, it has been found that a series of gradual increases in size (e.g. 25% for each incremental pass) are necessary in order to retain the template's proportional integrity and resolution. When the image is near its target scaled size, then the previously recorded template size measurements can be used to finalize the scaling of the template.

Once this initial type of scaling 45 is complete, the graphical image of the window template is used to drive a computer plotter (not shown) which draws 47 the template image to scale on, for instance, a white piece of paper. This plot is compared 49 to the master template and the stored computer image is fine tuned 51 accordingly by re-scaling and re-plotting 47 the template as necessary. Once tuned, the database contains an exact replica of the template which can be used again and again as that same vehicle enters the tinting shop. Once this process is repeated for each window 53 of a particular automobile, the full set of window templates can be optimized 55 so that the arrangement of the templates is minimized 23 on a piece of tinting film 7. The automobile templates are then categorized 57, and stored in memory 5 for that particular automobile.

Figure 3:
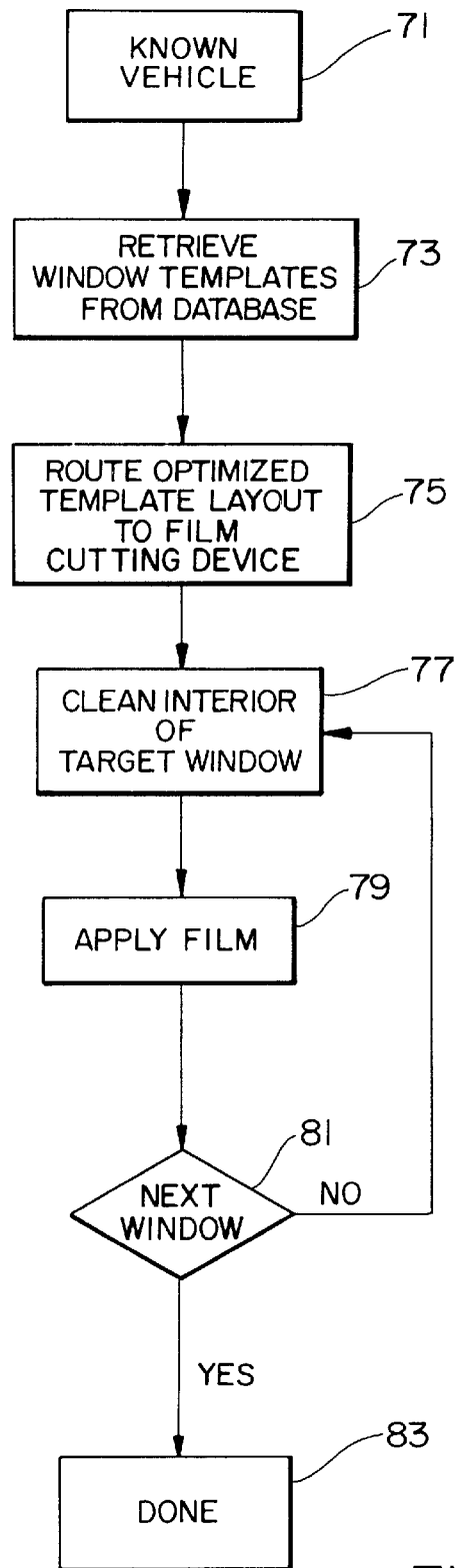
FIG. 3 is a flowchart of the steps performed in tinting a vehicle when the known window template information is currently in the database.

Referring now to FIG. 3, a flowchart is shown depicting the steps for tinting an automobile when the template data exists in the database. Once a known vehicle 71 is established, the aforementioned process entirely eliminates the need to recreate a new template for each window section of each vehicle, as is currently the practice. As shown, the template data is retrieved 73 from the database for the known vehicle 71. The template data for the entire window set can be stored in an optimized arrangement 75 (See also FIG. 1, elements 7, 23) or the individual templates for each window can be recalled and used separately. The templates are then routed to the film cutting device 75 (element 9, FIG. 1) where the tinting film is cut and the film backing is left intact for ease of use and installation. Using the cutting device virtually eliminates human error and the increased time associated with manually cutting a piece of film from a template pattern. Moreover, the graphical program allows the user to arrange the various template patterns in the most economical way across the width of the film to be cut, thus minimizing wasted film. The windows of the target vehicle are then cleaned 77 and the film is applied 79. The process is repeated 81 until all the vehicle windows are completed 83.

Figure 4:
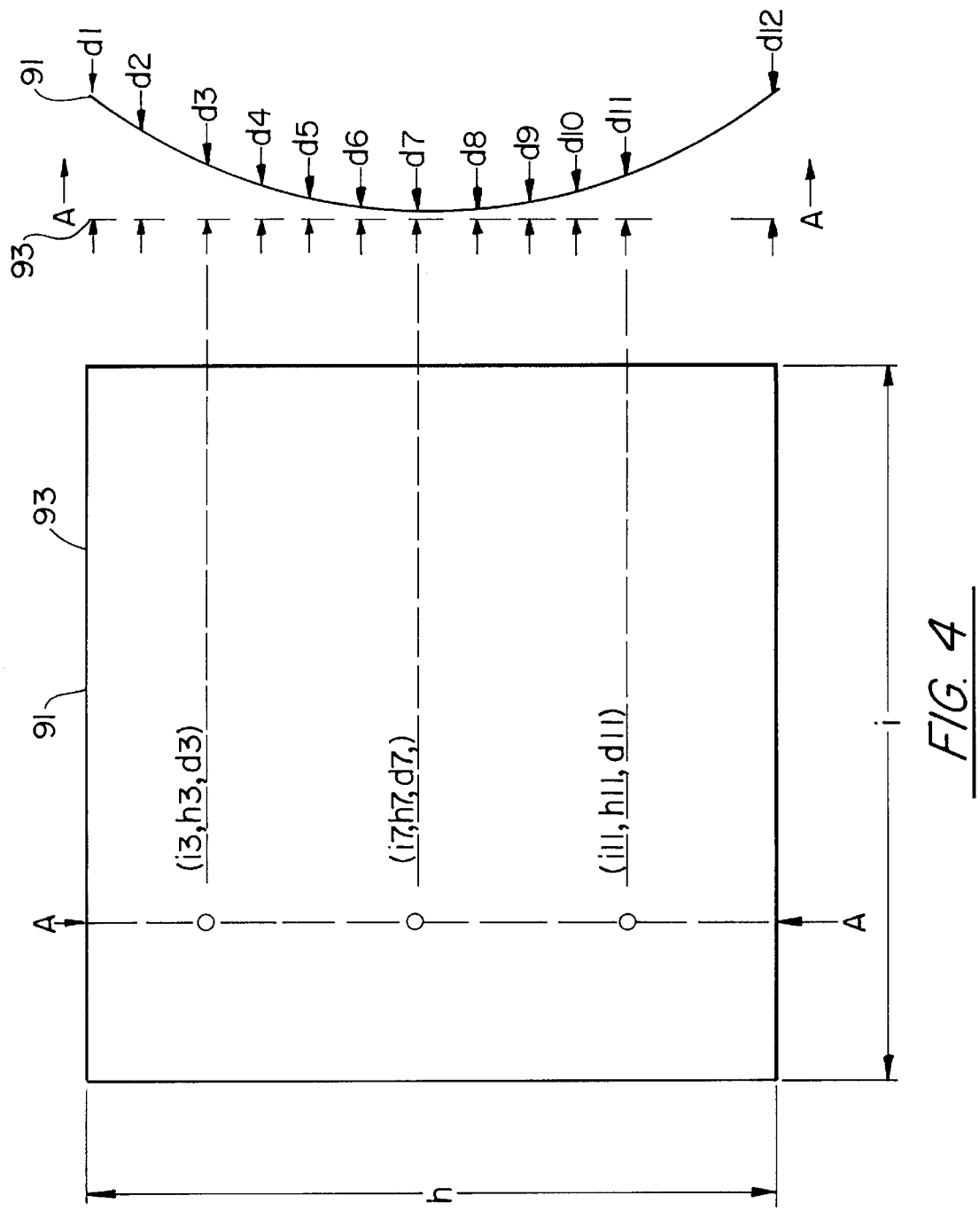
FIG. 4(a) is a front view of a curved window and a planar projection which is tangential with the window showing exemplary points with the coordinates (l#,h#,d#) where the curvature of the glass is measured by its distance d# from the plane at the points (l#,h#).
FIG. 4(b) is cross-sectional view showing cut A—A of FIG. 4(a) with various distances d# shown from the tangential plane to the glass.

Alternatively, the window template data can be entered into the computer database by photographing the target window for purposes of physically measuring its planar width and height (e.g. planar projection without the curvature). The resulting template, which would conform to the window's curvature, would be derived from an additional measurement of the curvature depth across various points along the window's plane. Referring to FIGS. 4(a) and 4(b), an example of this data format is shown. In FIG. 4(b), a cross-sectional cut A—A of a window 91 is shown with a relative degree of curvature. Tangential with the window 91 is a planar projection 93 of the area occupied by the curved window. In FIG. 4(a), a frontal view of window 91 and plane 93 is shown with the length l and the height h indicated. Along various example points on cut A—A the curvature of the window creates a distance d# away from the plane 93. These points might be represented by a three point coordinate system (l#,h#,d#) wherein the curvature of the window could be indicated for any given cross-sectional cut. The example points shown include (l3,h3,d3), (l7,h7,d7), and (l11,h11,d11). With a sufficient amount of data points— represented in any logical format—the graphics program could translate the curved window into a conforming flat template shape.

An additional embodiment would include enlarging the photograph of the template before scanning the image into the computer. This might be accomplished by enlarging the photograph or by copying the photograph on an enlarged setting before scanning it into the computer. Generally, if the digitized image is closer to actual size, then the graphics program needs to do less scaling and accordingly is less likely to distort the finalize image. This technique might lessen the fine tuning process needed to finalize the computerized template image.

Yet another embodiment contemplates tracing the target window on a piece of paper, photographing this tracing, and then scanning the tracing into a computer graphics program for appropriate scaling as before. Referring again to FIG. 2, these steps 61, 63 are shown in fathom as they bypass other steps of the aforementioned process.

Still another method would include obtaining the technical specifications (e.g. planar height and width, and curvature depth along planar points) of a variety of windows from the automobile manufacturers. Referring again to FIG. 2, this step 59 is shown in fathom as it bypasses several other steps of the aforementioned process. With the proper data and graphics program, a set of conforming templates can be generated, compiled, and stored. With this method, no master templates would need to be made, yet the resulting tinting film would properly conform to the windows curvature. In the occasional instance where a window is substantially planar, the graphics program might need only receive the geometrical measurements of the window in order to create a conforming template (e.g. a square 24 by 24 inches).

Referring again to FIG. 2, still another embodiment might use a digital scanner to directly scan in the master template 36 and eliminate any necessity for photographic steps. Since most templates would prove to be larger than the operating surface of a scanning device, the template could be scanned in sections. These scanned sections could then be rejoined into a complete template image through interaction with the graphical computer program.

Yet another alternative might involve use of a digiter means such as a digital pen or wand which is interactively connected to the computer. This digitizer could be passed over the template or directly over the window to capture the outline and/or shape of the target window (or template). The digitized shape would then be processed and scaled by the graphical computer program.

Similarly, any means whereby the 3-dimensional shape of the window is digitally rendered could then be processed by the computer into an equivalent 2-dimensional window template shape. A variety of scanning devices exist which might use a scanning medium such as laser light or sound or infrared to measure the contours of the scanned object. The resulting 3-dimensional model would eliminate any further need to physically generate or scan a template for the target window.

The aforementioned process might also be used on a variety of other windowed objects besides an automobile. Databases of standard window shapes for various models of boats, trucks, vans, Recreational Vehicle's (RV's), aircraft, and motorcycle windshields, for instance, might similarly be created and used. Additionally, standardized sizes of windows used in construction of residences and businesses might similarly be created and databased for future use.

Yet another benefit of the instant invention over its predecessors is its potential mobility. U.S. Pat. No. 5,421,939, as mentioned above, discloses a method of producing a graphic (e.g. faces, animals, etc.) for manufacture and assembly in a controlled environment prior to application to a surface (See Col. 1, lines 55–59) such as the glass window of a storefront (See Col. 1, line 68). On the contrary, the present invention is mobile and equally applicable to field work. Often customers with little free time prefer to have their vehicles tinted at their place of employment. Similarly, it might be difficult to bring a truck, RV, or aircraft into a window tinting shop. Also, buildings and residences are clearly location jobs which might require custom fitting of window tinting materials. Accordingly, the computer aided window tinting apparatus as suggested here, is highly portable and time efficient. A complete window tinting operation might be contained in a mobile van.

The present invention substantially reduces the waste and time required to fully tint the windows of an automobile. For example, two installers can completely tint an automobile (including cleanup time) in approximately 20 minutes or less. Additionally, the amount of training needed in order to tint an automobile is also significantly reduced, along with the number of persons needed for the job. An additional savings of 10%–20% is gained from optimizing use of the tinting film by optimally placing the various templates on the film sheet via the graphics program. The computer then drives the cutter for quick, precise, and efficient cutting of the single layer film patterns.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. An apparatus for creating and storing window template information for thereby efficiently tinting the windows of a vehicle, said apparatus comprising:

(I) a computer means with memory storage for storing and databasing vehicular window template data;

(ii) a data collection means which is a digitizer means selected from the group consisting of an electronic pen or wand for physically measuring window shapes and which interacts with said computer and produces accurate size and shape representations of window surfaces for processing new window template data into a digitized template representation, wherein said representation is downloaded into said computer means;

(iii) a graphics program for receiving said downloaded digitized template representations, said program being capable of scaling, manipulating, organizing, and printing said template representations;

(iv) a film cutting means for forming desired window tinting film sections, said cutting means being driven by data received from said computer means and said graphics program, said cutting means having enough precision to cut through said window tinting film while leaving a film backing intact.

2. The apparatus for tinting windows according to claim 1, wherein said digitizer means includes a 3-dimensional scanner to generate a 3-dimensional model of the window surface which is then processed to produce a 2-dimensional template.

3. The apparatus for tinting windows according to claim 2, wherein said scanner utilizes laser light to form a 3-dimensional image.

4. The apparatus for tinting windows according to claim 2, wherein said scanner utilizes sonar to form a 3-dimensional image.

5. The apparatus for tinting windows according to claim 2, wherein said scanner utilizes infrared to form a 3-dimensional image.

* * * * *